(12) United States Patent
Schnieder et al.

(10) Patent No.: US 7,192,653 B2
(45) Date of Patent: Mar. 20, 2007

(54) PREPREG

(75) Inventors: Christa Schnieder, Amelinghausen (DE); Heinz Haller, Plochingen (DE)

(73) Assignee: Technocell Dekor GmbH & Co. KG (DE)

( * ) Notice: Subject to any disclaimer, the term of this patent is extended or adjusted under 35 U.S.C. 154(b) by 266 days.

(21) Appl. No.: 10/483,610

(22) PCT Filed: Feb. 9, 2002

(86) PCT No.: PCT/EP02/01386

§ 371 (c)(1),
(2), (4) Date: May 26, 2004

(87) PCT Pub. No.: WO03/008708

PCT Pub. Date: Jan. 30, 2003

(65) Prior Publication Data

US 2004/0197591 A1    Oct. 7, 2004

(30) Foreign Application Priority Data

Jul. 14, 2001    (DE) ................................ 101 34 302

(51) Int. Cl.
  B32B 5/16    (2006.01)
(52) U.S. Cl. .................... 428/532; 428/536; 428/537.5
(58) Field of Classification Search ................ 428/532, 428/536, 537.5
  See application file for complete search history.

(56) References Cited

U.S. PATENT DOCUMENTS

| 4,377,458 A | 3/1983 | Watanabe |
| 4,652,324 A | 3/1987 | Yamashina et al. |
| 5,607,769 A | 3/1997 | Choate |
| 5,885,719 A | 3/1999 | Perrin |
| 6,113,987 A | 9/2000 | Horst |
| 6,143,369 A | 11/2000 | Sugawa et al. |
| 6,146,746 A | 11/2000 | Reck et al. |
| 6,299,936 B1 | 10/2001 | Reck et al. |
| 6,312,827 B1 | 11/2001 | Horst |
| 6,709,764 B1 | 3/2004 | Perrin et al. |

FOREIGN PATENT DOCUMENTS

| WO | WO 95/17551 | 6/1995 |
| WO | WO 99/28554 | 6/1999 |
| WO | WO 00/53667 | 9/2000 |
| WO | WO00/53667 | * 9/2000 |

OTHER PUBLICATIONS

H. Arnold et al. "Herstellung einseitig impragnierter Druckpapiere mittles Filmpresse", Wochenblatt fur Papierfabrikation, Jun. 2000, pp. 350-355.
E.Zeyringer et al. "Einflusse der Trocknung auf die Eigenschaftsentwicklung holzfreier mehrfact gestrichener Papiere", Wochenblatt fur Papierfabrikation,Jun. 2000, p. 356.
Von Holger Arnold et al. "Neue Vorimpragnate", Werkstoffe Dekorpapier, HK, Jun. 2001, pp. 36-38.

* cited by examiner

*Primary Examiner*—Leszek Kiliman
(74) *Attorney, Agent, or Firm*—Cook, Alex, McFarron, Manzo, Cummings & Mehler, Ltd.

(57) ABSTRACT

A prepreg can be obtained by impregnating a base paper with a heat-curing resin free from formaldehyde, the prepreg exhibiting a residual moisture content of 2 to 4% by weight after drying, the resin of the prepreg being non-crosslinked and exhibiting a degree of crosslinking of maximum about 85% in the case of thermal treatment of the prepreg over a period of about 40 seconds at about 132° C.

24 Claims, 3 Drawing Sheets

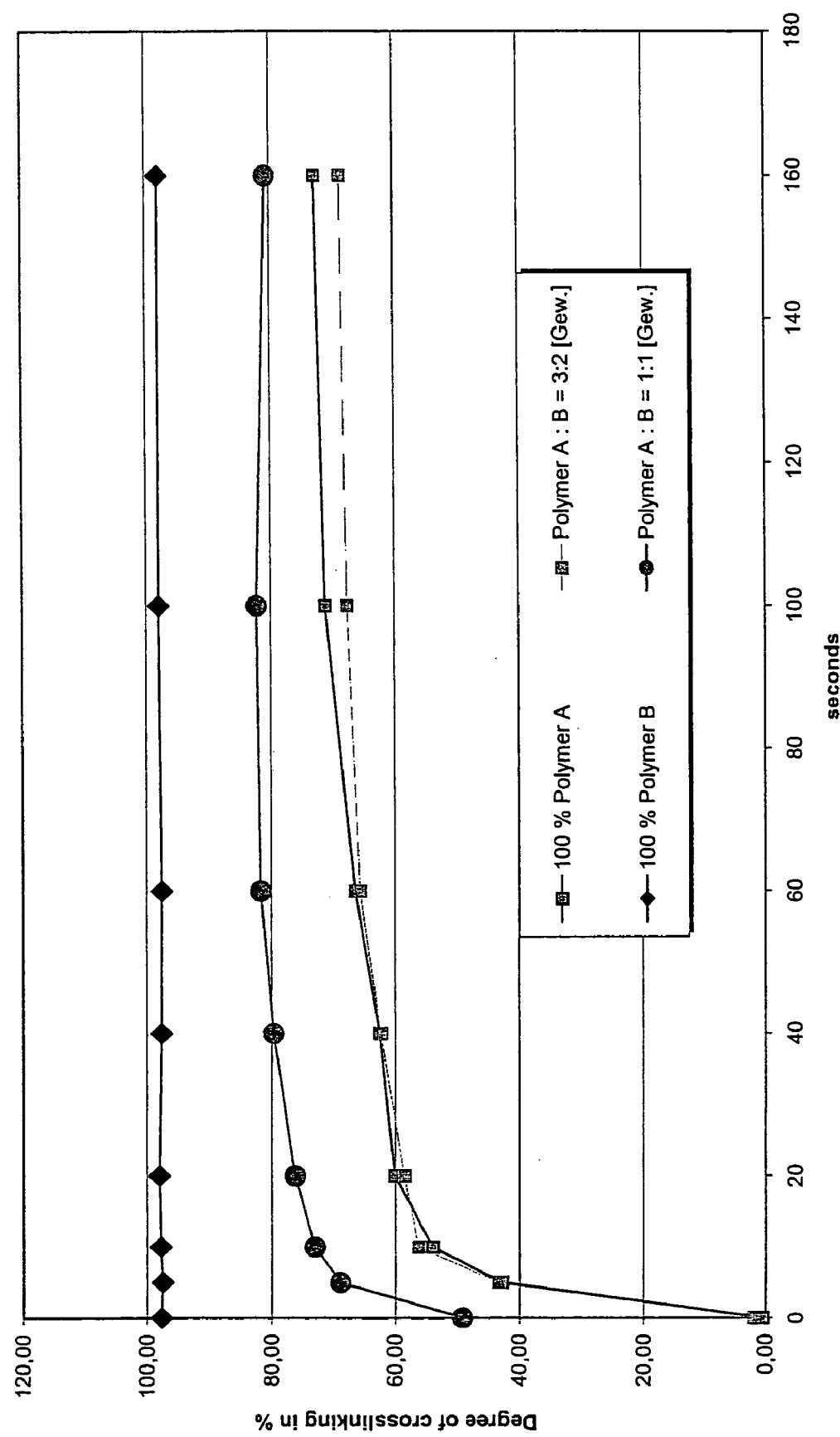

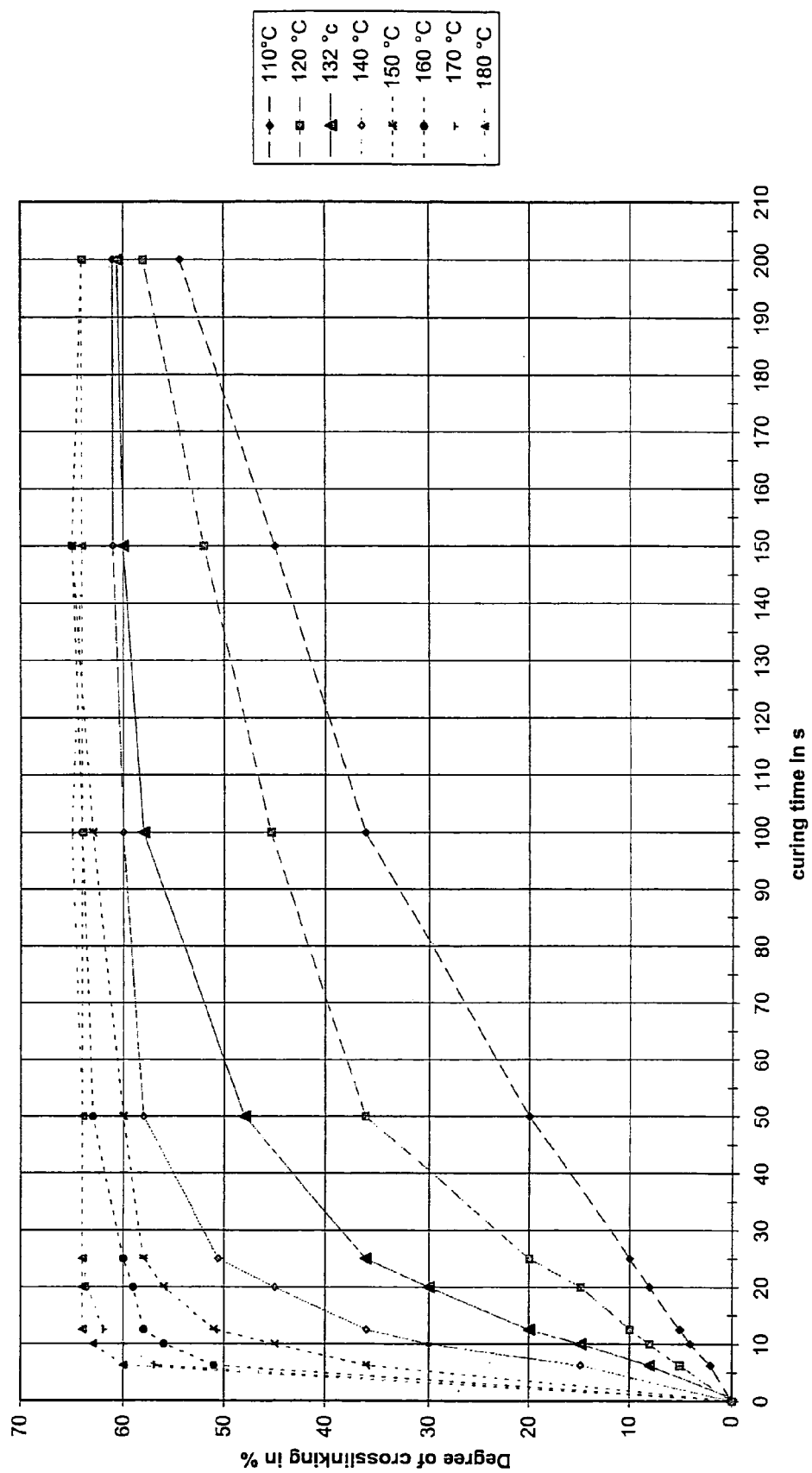
Fig. 2 - Degree of crosslinking

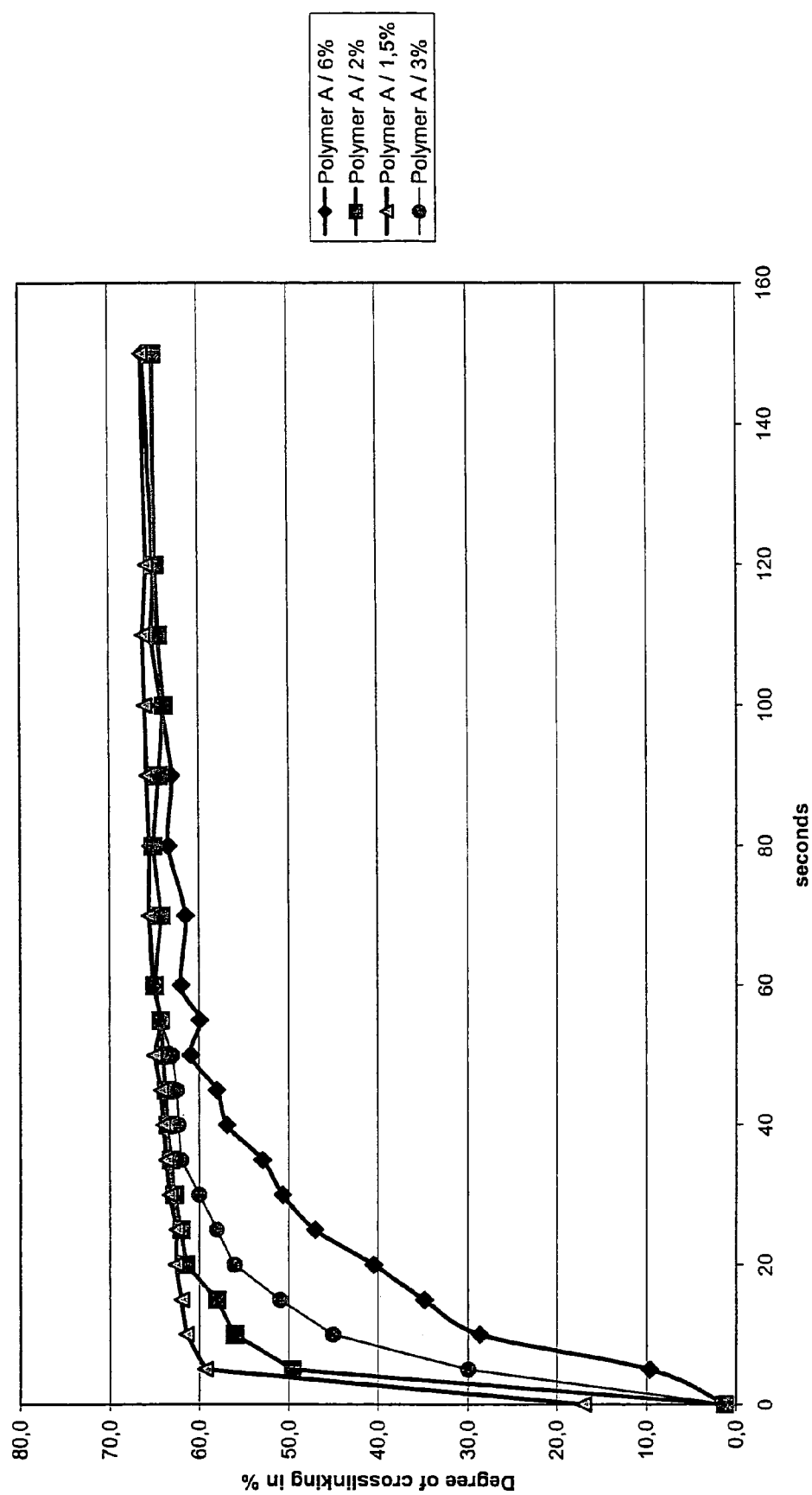

PREPREG

The invention relates, to prepregs, a process for their production and decorative impregnated materials or decorative coating materials obtainable therefrom.

Decorative coating materials, so-called decorative paper or decorative sheets, are preferably used as surface coatings in the manufacture of furniture and in the field of interior furnishing, in particular for laminate flooring. Decorative paper/decorative sheets should be understood to mean synthetic resin-impregnated or synthetic resin-impregnated and surface-treated, printed or unprinted types of paper. Decorative paper/decorative sheets are size-bonded or adhesive-bonded to a backing panel.

Depending on the type of impregnation process used, a distinction is made between decorative paper/decorative sheets with a fully impregnated paper core and the so-called prepregs in the case of which the paper is impregnated only partially in the paper making machine on line or off line. None of the prepregs known so far which contain formaldehyde-containing thermosetting resins or low formaldehyde acrylate binders' satisfy the requirements imposed on them such as good printability, high resistance to splitting, high bondability and good coatability.

To bond decorative sheets onto wooden materials such as chipboard or MDF panels, urea sizes or polyvinyl acetate (PVAC) sizes are generally used. The adhesive bond of the decorative sheets is not always guaranteed.

High pressure laminates are laminates produced by compressing several impregnated, superimposed layers of paper. The construction of these high pressure laminates generally consists of a transparent overlay providing maximum surface resistance, a sheet of resin-impregnated decorative paper and one or several layers of kraft paper treated with phenol resin.

Hardboard or woodchip board as well as plywood, for example, are used as substrates for this purpose.

In the case of low pressure laminates, the decorative paper saturated with synthetic resin is laminated directly to a substrate such as chipboard while applying a low pressure.

The decorative paper used with the above-mentioned coating materials is employed in the white or coloured state with or without additional print.

Particular requirements are imposed on the so-called decorative base paper when used as starting materials for the manufacture of the above-mentioned coating materials, such as a high opacity for a better coverage of the substrate, a homogeneous formation and grammage of the sheet for a homogeneous resin absorption, a high level of light fastness, a high purity and evenness of the colour for a good reproducibility of the pattern to be printed, a high wet strength for a friction-free impregnating process, a corresponding absorbency to achieve the required degree of resin saturation and dry strength during reel-slitting operations in the paper making machine and during printing in the printing machine.

To achieve a decorative surface, the decorative base papers are printed. In particular, the so-called rotogravure printing process is used during which the printed image is transferred onto the paper by means of several gravure rollers. The individual printed dots should be transferred onto the paper surface completely and as intensively as possible. However, in the case of decorative gravure printing, in particular, only a small part of the pixels present on the gravure roller are transferred onto the paper surface. The so-called missing dots, i.e. voids are formed. Frequently, the printing ink penetrates too deeply into the paper structure as a result of which the colour intensity is reduced. Preconditions for a good printed image with few missing dots and a high colour intensity are a surface topography as smooth and as homogeneous as possible and a matching colour acceptance behaviour of the paper surface.

For this reason, base paper is usually smoothed with the so-called soft calenders, in some cases also with the so-called Janus calenders. This treatment can lead to bruising of the paper surface and consequently its compaction, with a negative effect on the resin absorption capacity.

The impregnating resin solutions usually used to impregnate the decorative base papers consist of resins based on urea, melamine or phenol resins and contain formaldehyde and lead to brittle products with a poor tear propagation resistance and printability.

In DE 197 28 250 A, the use of resins free from formaldehyde based on an acrylic acid ester-styrene copolymer is described for the production of non-yellowing prepregs. This material has the disadvantage that it leads to a product with a poor resistance to splitting.

A similar problem arises in the case of the film described in DE 29 03 172 A. The impregnating liquid containing a synthetic resin crosslinkable with an aminoplastic penetrates into the paper core highly unevenly such that zones with different degrees of impregnation arise leading to splitting of the paper core. Another disadvantage is that the impregnating liquid is not free from formaldehyde.

The so-called post-impregnated materials which, apart from prepregs, belong to the decorative films with a finished film character are impregnated after decorative printing. For this purpose, decorative papers smooth on one side of 40 to 80 $g/m^2$ have so far been impregnated with mixtures of polyacrylates and urea formaldehyde resins. The acrylate dispersions used for this purpose penetrate only very slowly into the paper such that the majority of the acrylates used are present in the built-up state at the surface or underneath whereas a relative build-up of urea formaldehyde resin components occurs in the paper core. This can cause problems during processing. Also, the requirements regarding bondability and resistance to splitting are not always fulfilled.

Consequently, the invention is based on the task of providing prepregs which do not exhibit the above-mentioned disadvantages and are characterised in particular by an excellent surface finish, good printability, high resistance to splitting, good varnish acceptance (good varnish holdout) and bondability with other adhesives.

This task is achieved by means of a prepreg which can be produced by impregnating a base paper with a heat-curing resin free from formaldehyde, the prepreg having a residual moisture content of 2 to about 3% by weight, the resin of the prepreg being not crosslinked and, in the case of thermal treatment of the prepreg over a period of about 40 seconds at about 132° C., exhibiting a degree of crosslinking of maximum about 85%, preferably maximum about 80%.

The degree of crosslinking was determined by punching out from a prepreg a surface area of 100 $cm^2$, weighing it and keeping it for 15 minutes in water at a temperature of 60° C., rinsing it, drying it in the oven at 130° C. and weighing it again. On the basis of the difference in weight and the known application of the impregnating resin (13 $g/m^2$ in the dry state), the soluble portion of the polymer can be determined. Degree of crosslinking in %=100−soluble portion in %.

According to the invention, prepreg should be understood to mean paper partially impregnated with resin. The proportion of the resin is 20 to 35% by weight, preferably 25 to 30% by weight, based on the weight of the base paper.

According to a preferred embodiment of the invention the prepreg has a residual moisture content of up to about 2.5%. In the case of residual moisture contents of substantially less than 2%, e.g. about 1.5%, tearing of the paper web may occur. In the case of residual moisture contents of more than 3%, the prepreg may adhere to machine parts in the processing equipment and resin residues may deposit on parts of the machine. In addition, higher residual moisture contents have the disadvantage of slow crosslinking under the effect of heat during processing and a lack of sealant effect during lamination on wood.

The subject matter of the invention also consists of a process for the production of such a prepreg. This process can be carried out in the paper making machine following the web formation. The subject matter of the invention also consists of decorative papers and decorative coating materials which are made using the prepreg described above.

Polymers suitable for impregnation are those which exhibit a thermoplastic behaviour at temperatures of up to 150° C. and a thermosetting behaviour as a result of crosslinking at temperatures above 150° C.

A polyhydric alcohol from the group of diols, glycols or sugar alcohols such as pentaerythritol, trimethylol propane and their mixtures can be selected as crosslinking components, or alkanolamines can be used.

According to a preferred embodiment, a resin can be used to impregnate the base paper, which resin
  contains at least one polymer obtainable by radical polymerisation, which polymer contains less than 5% by weight of an α,β-ethylenically unsaturated mono or dicarboxylic acid in the polymerised state,
  contains at least one polymer obtainable by radical polymerisation, which polymer contains more than 15. % by weight of an α,β-ethylenically unsaturated mono or dicarboxylic acid in the polymerised state, and
  contains at least one alkanolamine with at least two hydroxyl groups.

According to a further preferred embodiment, a resin can be used to impregnate the base paper, which resin
  contains at least one polymer obtainable by radical polymerisation, which polymer contains up to 5 to 100% by weight, in particular 5 to 50% by weight or 10 to 40% be weight of an α,β-ethylenically unsaturated mono or dicarboxylic acid in the polymerised state, and
  at least one alkanolmine with at least two hydroxyl groups.

Preferably, α,β-ethylenically unsaturated mono or dicarboxylic acids are those with three to six carbon atoms, in particular acrylic acid, methacrylic acid, crotonic acid, fumaric acid, maleic acid, 2-methyl maleic acid or itaconic acid as well as half-esters of ethylenically unsaturated dicarboxylic acids such as maleic acid monoalkyl esters of $C_1$ to $C_8$ alkanols. An acrylic acid-maleic acid copolymer is particularly preferred. The alkanolamine can be one with the general formula N(R1,R2,R3) wherein R1 may represent an H atom, a $C_{1-10}$ alkyl group or a $C_{1-10}$ hydroxyalkyl group and R2 and R3 may represent a $C_{1-10}$ hydroxyalkyl group. Suitable alkanolamines are, for example, diethanolamine, triethanolamine and methyldiethanolamine. Such resins, their manufacture and alkanolamines are disclosed in DE 197 35 959 A1 and in WO 97/31060, reference to the disclosure of which is made for the purposes of the disclosure of the present invention.

The polymer (I) to be used according to the invention can be used alone or in mixture with other polymers (II), in particular with styrene-butadiene or styrene-acrylate copolymers, in which the quantitative ratio of I/II may be 90:10 to 65:35, in particular 80:20 to 70:30. The other polymer (II) can also consist of a radiation curing polymer which, for example, can be cured by electron or UV radiation. This is present in the uncured state in the prepreg according to the invention.

The polymer to be used according to the invention is applied as an aqueous solution together with a polyhydric alcohol used as crosslinking component onto at least one side of the paper web and subsequently dried to a residual moisture content of 2 to 3%, preferably up to about 2.5%. In this state, the polymer has penetrated into the base paper; the base paper is impregnated and the polymer is not crosslinked.

The concentration of the polymer in the solution used for impregnation may amount to 5 to 50% by weight, preferably 10 to 40% by weight and particularly preferably 15 to 30% by weight, based on the mass of the aqueous polymer solution in each case. The mixture of water and polymer can contain further additives.

The polymer to be used according to the invention can be applied onto the paper web in a quantity of 10 to 70%, preferably of 15 to 60%, particularly preferably of 20 to 50% of the weight per unit area of the base paper.

According to a particular embodiment of the invention, the face of the base paper can first of all be coated with an acrylate dilutable with water and curable by electron radiation in the form of a dispersion, emulsion or solution and subsequently impregnated according to the invention from the back. A coating preparation curable by electron radiation and suitable for coating the face is described in DE 44 13 619 A, reference to the disclosure of which is made for the purposes of the disclosure of this invention.

Surprisingly enough, it has been found that the base paper coated according to the invention has a surface with a high level of smoothness and a series of other excellent properties such as high resistance to splitting and an excellent bondability with urea sizes and PVAC sizes. In addition, micrographs of the printed papers show a complete transfer of the individual printed dots illustrated by only a few missing dots.

The polymer used according to the invention is characterised not only by a satisfactory bondability with the usual adhesives but also by self-adhesive properties (sealability). It is thus possible to dispense with the use of adhesives when laminating decorative papers impregnated from the back with the polymer solution according to the invention, with the carrier. Prepregs arising as waste during production can be recycled into the production process in a quantity of up to 15% by weight, based on the weight of the pulp.

Particularly with respect to the prepregs and the post-impregnated materials mentioned in the beginning, excellent results have been obtained with the prepregs according to the invention. Particularly the poor printability and poor resistance to splitting commonly encountered in the case of conventional prepregs have been substantially improved. In this respect, the printability of the prepreg according to the invention can be compared with the printability of a post-impregnated material. This leads to savings in material since it is possible to achieve the printing quality of a post-impregnated material with an application quantity of impregnating resin usually used for a prepreg.

A further advantage is obtained with respect to the weight per unit area of the base paper to be impregnated. Whilst it had been possible to previously use base papers with a weight per unit area of maximum 70 $g/m^2$ in the case of prepregs, the weight per unit area can be increased to 100 to 150 g/m² as a result of the better penetration, into the paper core, of the polymer to be used according to the invention. Whereas, previously, impregnation took place at a rate of operation of the paper making machine of about 200 m/min., the process according to the invention allows rates of impregnation of 300 to 380 m/min.

The base papers to be treated according to the invention are those which have undergone neither engine sizing nor surface sizing. They consist in particular of paper not exhibiting a pigment coating. Such papers may consist of the so-called decorative base papers. These consist essentially of pulp, pigments and fillers and the usual additives. The usual additives may consist of wet strength agents, retention aids and fixing agents. Decorative base papers differ from the usual types of paper by their much higher filler content or pigment content and the absence of engine sizing or surface sizing commonly used for paper.

The base paper to be impregnated according to the invention may contain a high proportion of a pigment or a filler. The proportion of filler in the base paper may amount to as much 55% by weight, in particular 11 to 50% by weight or 20 to 45% by weight, based on the weight of the paper. Suitable pigments and fillers are, for example, titanium dioxide, talcum, zinc sulphide, kaolin, aluminium oxide, calcium carbonate, corundum, aluminium silicate and magnesium silicate or their mixtures.

The so-called overlay papers are also suitable for impregnating according to the invention. They may exhibit a weight per unit area of 15 to 80 g/m². They exhibit an oxygen permeability according to Gurley of less than about 3 seconds and are usually free from fillers. To produce abrasion-resistant surfaces, the overlays may contain 1 to 25 g/m² of corundum on the surface.

The prepregs according to the invention can be printed by the ink-jet process with or without a recording surface.

Coniferous wood pulps (long-fibre pulps) and/or deciduous wood pulps (short-fibre pulps) may be used as pulps for the manufacture of the base papers. The use of cotton fibres and mixtures thereof with the above-mentioned types of pulp is also possible. A mixture of deciduous wood/coniferous wood pulps in a ratio of 10:90 to 90:10, for example, or mixtures of coniferous wood/deciduous wood pulps in a ratio of 30:70 to 70:30, for example, are particularly preferred.

Preferably, the pulp mixture contains a proportion of cationically modified pulp fibres of at least 5% by weight, based on the weight of the pulp mixture. A proportion of 10 to 50% by weight, in particular 10 to 20% by weight of the cationically modified pulp in the pulp mixture has proved to be particularly advantageous. The cationic modification of the pulp fibres can take place by reacting the fibres with an epichlorohydrin resin and tertiary amine or by reaction with quarternary ammonium chlorides such as chlorohydroxypropyl trimethyl ammonium chloride or glycidyl trimethyl ammonium chloride. Cationically modified pulps and their manufacture are known from DAS PAPIER, volume 12 (1980), page 575–579, for example.

The base papers can be produced on a Fourdrinier paper making machine or a Yankee paper making machine. For this purpose, the pulp mixture can be ground with a stock consistency of 2 to 5% by weight up to a degree of beating of 10 to 45° SR. In a mixing vat, the fillers such as titanium dioxide and talcum and wet strength agents can be added and thoroughly mixed with the pulp mixture. The slush pulp thus obtained can be diluted to a stock consistency of about 1% and, insofar as necessary, other auxiliary agents such as retention aids, defoaming agents, aluminium sulphate and other auxiliary agents mentioned above can be admixed. This thin pulp is passed via the headbox of the paper making machine to the wire section. A non-woven sheet of fibres is formed and, after dewatering, the base paper is obtained which is subsequently dried. The weight per unit area of the paper produced may be 15 to 300 g/m².

The application of the polymer solution to be used according to the invention can take place in the paper making machine or off line by spraying, impregnation, roller application or blade application (doctor blade). Application via a size press or film press is particularly preferred. It is also possible to add the polymer to the pulp suspension as a solidifying agent in concentrations of up to 5% by weight, based on the mass of the pulp.

After drying, the prepregs can be printed and varnish-coated and subsequently applied onto a substrate such as a wooden board. In this case, the property of the polymers used according to the invention of being thermoplastic, i.e. formable and flexible up to certain temperatures, is highly advantageous during further processing of the paper impregnated therewith. It is thus possible, for example, to roll up prepregs without problem or to form them three-dimensionally before they are hot laminated to the carier during the last process step. As a result of the temperature effect, crosslinking of the polymer and consequently the transition to the thermosetting properites take place.

FIG. 1 shows a graphic representation illustrating, as an example, the development of the degree of crosslinking at a temperature of 132° C. over a period of 160 seconds for three prepregs according to the invention and one comparative prepreg.

FIG. 2 shows the degree of crosslinking of the resin of a prepreg impregnated according to the invention as a function of the time at different temperatures.

FIG. 3 shows the effect of different residual moisture contents on crosslinking of the impregnating resin. This illustration shows that, with elevated moisture contents, crosslinking takes place too slowly which is uneconomic during further processing.

The following examples serve the purpose of further illustrating the invention. Values in percent by weight relate to the weight of the pulp, unless other information is given.

EXAMPLE 1

A base paper was produced from a pulp mixture consisting of 80% eucalyptus pulp and 20% coniferous wood sulphate pulp with 0.6% epichlorohydrin resin as wet strength agent, 0.11% of a retention aid and 0.03% of a defoaming agent. The mixture was adjusted with aluminium sulphate to a pH of 6.5 and a pigment mixture of 29% by weight of titanium dioxide and 5.2% by weight of talcum was added to the mixture.

In a Fourdrinier paper making machine, a base paper with weight per unit area of 50 g/m² and an ash content of 23% by weight of ash was produced.

This base paper was impregnated with a solution of a modified polyacrylic acid and a polyhydric alcohol in a size press on the face, a solids content of about 30% being adjusted with water. Subsequent drying of the paper took place at 120° C. up to a residual moisture content of 2%. The application quantity after drying was 13 g/m².

EXAMPLE 2

The base paper from example 1 was impregnated on the face in the size press with an aqueous solution containing 2 parts of a modified polyacrylic acid crosslinkable with polyols and 1 part of a styrene-butadiene copolymer. The solids content of the solution was adjusted with water to about 30%. The application quantity in the dry state was 12 g/m². The samples were satinised in a laboratory calender.

The following Table 1 shows the results of the tests of the paper specimens treated according to the invention in comparison with conventionally impregnated papers based on aminoplastic with formaldehyde (Reference 1) and based on a styrene-butadiene-acrylate dispersion without formaldehyde (Reference 2).

The determination of the smoothness took place according to DIN 53 107 (TAPPI sm 48). The specimens treated with the polymer used according to the invention exhibit a greater smoothness than the reference specimens (Table 2).

The resistance to splitting was measured according to an in-house test method. The varnish holdout provides information on whether the resin has penetrated evenly into the paper such that no pulp fibres protrude from the paper.

TABLE 1

| Test | Example 1 | Example 2 | Reference 1 | Reference 2 |
|---|---|---|---|---|
| Resistance to splitting | Stage 5 = excellent | Stage 5 = excellent | Stage 4 = good | Stage 1 = unsatisfactory |
| Bondbility with UF adhesives | excellent | excellent | excellent | satisfactory |
| Bondability with PVA | good | good | good | excellent |
| Varnish holdout | excellent | excellent | good | good |
| Sealability | yes | yes | no | no |

A prepreg with a weight per unit area of base paper of 50 g/m², a residual moisture content after drying of 2% and a substance weight following impregnation and drying of 63 g/m² was subjected to thermal treatment at a temperature of 132° C. The duration of treatment was 0 to 300 seconds.

The degree of crosslinking of the specimens was determined by punching out areas of 100 cm², weighing them and keeping them for 15 minutes in 60 g of warm water, rinsing them, drying them in the oven at 130° C. and weighing them again. From the difference in weight and the known coating weight of the impregnating resin (13 g/m² in the dry state), the soluble portion of the polymer can be determined. Degree of crosslinking in %=100−soluble portion in %.

The samples obtained were satinised in a laboratory calender (V=16.4 min; p=20 N/mm; T=60° C.).

The satinised samples were printed in a sample printer using the gravure printing method. The measured results obtained regarding the degree of crosslinking, the smoothness and the defective surface area are given in the following Table 2.

In Table 2, the results are given of a so-called missing dot analysis (MDA) carried out with an Agfa-Duo scanner and the PTS-Domas software. For this purpose, the papers to be tested were printed, the printed surfaces were scanned, compared with each other by checking whether the printed dots are represented on all printing points or whether so-called missing dots are present. The result is given as a percentage value of missing dots based on the surface area examined.

TABLE 2

| Time [s] | Degree of cross-linking | Bekk smoothness [s] Example 1 | Bekk smoothness [s] Example 2 | Defective area [%] Example 1 | Defective area [%] Example 2 |
|---|---|---|---|---|---|
| 0 | 0 | 163 | 180 | 7.6 | 8.2 |
| 25 | 36.1 | 125 | 130 | 11.8 | 12.5 |
| 50 | 48 | 125 | 130 | 12.0 | 13.0 |
| 100 | 58 | 97 | 115 | 11.5 | 12.3 |
| 200 | 60.6 | 115 | 120 | 10.8 | 13.2 |
| 300 | 74 | 113 | 120 | 11.7 | 12.5 |
| Reference I | 100 | 170 | | 12.0 | |
| Reference II | 100 | 158 | | 14.8 | |

The invention claimed is:

1. A prepreg which can be produced by impregnating a base paper with a heat-curing resin free from formaldehyde characterized in that after drying the prepreg has a residual moisture content of 2 to about 3% by weight, after drying of the prepreg the resin of the prepreg is thermoplastic and during the further processing of the dried prepreg as a result of a temperature effect is crosslinkable to a polymer with thermosetting properties and the resin is a polymer which
    contains at least one polymer obtainable by radical polymerisation, which polymer contains less than 5% by weight of an α,β-ethylenically unsaturated mono or dicarboxylic acid in the polymerised state,
    contains at least one polymer obtainable by radical polymerisation, which polymer contains more than 15% by weight of an α,β-ethylenically unsaturated mono or dicarboxylic acid in the polymerised state, and
    contains at least one alkanolamine with at least two hydroxyl groups or
    the resin is a polymer which
    contains at least one polymer obtainable by radical polymerisation, which polymer contains up to 5 to 100% by weight of an α,β-ethylenically unsaturated mono or dicarboxylic acid in the polymerised state, and
    at least one alkanolamine with at least two hydroxyl groups.

2. The prepreg according to claim 1, wherein said degree of crosslinking of the resin in the case of thermal treatment of the prepreg over a period of about 40 seconds at about 132 C. amounts to a maximum of about 80%.

3. The prepreg according to claim 1, wherein the resin is present in mixture with a further polymeric material, polymer II.

4. The prepreg according to claim 3, wherein the resin is present in mixture with a further polymeric material, polymer II, in a ratio of 90:10 to 65:35.

5. The prepreg according to claim 3, wherein the polymer II is a polymeric material curable by UV/electron radiation.

6. The prepreg according to claim 1, wherein the resin is contained in the base paper in a quantity of 10 to 70% of the weight per unit area of the base paper.

7. The prepreg according to claim 3, wherein the resin is contained in the base paper in a quantity of 10 to 70% of the weight per unit area of the base paper.

8. The prepreg according to claim 1, wherein a radiation curing layer is contained on at least one side of the base paper.

9. The prepreg according to claim 3, wherein a radiation curing layer is contained on at least one side of the base paper.

10. The prepreg according to claim 7, wherein a radiation curing acrylate layer is contained on the face of the base paper.

11. The prepreg according to claim 1, wherein the prepreg is a decorative prepreg.

12. A decorative paper or decorative coating material comprising a prepreg which can be produced by impregnating a base paper with a heat-curing resin free from formaldehyde characterized in that after drying the prepreg has a residual moisture content of 2 to about 3% by weight, after drying of the prepreg the resin of the prepreg is thermoplastic and during the further processing of the dried prepreg as a result of a temperature effect is crosslinkable to a polymer with thermosetting properties and the resin is a polymer which
    contains at least one polymer obtainable by radical polymerisation, which polymer contains less than 5% by weight of an $\alpha,\beta$-ethylenically unsaturated mono or dicarboxylic acid in the polymerised state,
    contains at least one polymer obtainable by radical polymerisation, which polymer contains more than 15% by weight of an $\alpha,\beta$-ethylenically unsaturated mono or dicarboxylic acid in the polymerised state, and
    contains at least one alkanolamine with at least two hydroxyl groups or
the resin is a polymer which
    contains at least one polymer obtainable by radical polymerisation, which polymer contains up to 5 to 100% by weight of an $\alpha,\beta$-ethylenically unsaturated mono or dicarboxylic acid in the polymerised state, and
    at least one alkanolamine with at least two hydroxyl groups.

13. The decorative paper or decorative coating material according to claim 12, wherein said polymer is present in mixture with a further polymeric material, polymer II.

14. A process for the production of a prepreg comprising application, on the surface of the paper web of a non-coated paper, a heatcuring resin free from formaldehyde characterized in that the prepreg is dried in such a way that a residual moisture content of 2 to about 3% by weight is adjusted and the resin remains thermoplastic, and during the further processing of the dried prepreg as a result of a temperature effect is crosslinkable to a polymer with thermosetting properties and a polymer is used as resin which
    contains at least one polymer obtainable by radical polymerisation, which polymer contains less than 5% by weight of an $\alpha,\beta$-ethylenically unsaturated mono or dicarboxylic acid in the polymerised state,
    contains at least one polymer obtainable by radical polymerisation, which polymer contains more than 15% by weight of an $\alpha,\beta$-ethylenically unsaturated mono or dicarboxylic acid in the polymerised state, and
    contains at least one alkanolamine with at least two hydroxyl groups or
a polymer is used as resin which
    contains at least one polymer obtainable by radical polymerisation, which polymer contains up to 5 to 100% by weight of an $\alpha,\beta$-ethylenically unsaturated mono or dicarboxylic acid in the polymerised state, and
    at least one alkanolamine with at least two hydroxyl groups.

15. The process according to claim 14, wherein said resin is used which in the case of thermal treatment of the prepreg over a period of about 40 seconds at about 132° C. exhibits a degree of crosslinking of maximum about 80% .

16. The process according to claim 14, wherein the resin is present in mixture with a further polymeric material, polymer II.

17. The process according to claim 16, wherein the resin is present in mixture with a further polymeric material, polymer II, in a ratio of 90:10 to 65:35.

18. The process according to claim 16, wherein the polymer II is a polymeric material curable by UV/electron radiation.

19. The process according to claim 14, wherein the impregnating resin is applied onto the paper web in a quantity of 10 to 70% of the weight per unit of surface area of the base paper.

20. The process according to claim to 16, wherein the impregnating resin is applied onto the paper web in a quantity of 10 to 70% of the weight per unit of surface area of the base paper.

21. The process according to one claim 14, wherein a layer containing at least one radiation curing polymer is applied onto the face of the base paper and impregnation with the resin is carried out from the back of the base paper.

22. The process according to claim 16, wherein a layer containing at least one radiation curing polymer is applied onto the face of the base paper and impregnation with the resin is carried out from the back of the base paper.

23. The process according to claim 14, wherein the solution or dispersion containing the impregnating resin is applied onto the paper with a film press or size press.

24. The process according to claim 16, wherein the solution or dispersion containing the impregnating resin is applied onto the paper with a film press or size press.

* * * * *